(12) United States Patent
Sato et al.

(10) Patent No.: US 12,278,386 B2
(45) Date of Patent: Apr. 15, 2025

(54) BATTERY PACK AND ELECTRONIC DEVICE

(71) Applicant: MURATA MANUFACTURING CO., LTD., Kyoto (JP)

(72) Inventors: Ken Sato, Kyoto (JP); Madoka Hamano, Kyoto (JP); Kenichi Ozawa, Kyoto (JP); Masashi Sato, Kyoto (JP); Mikio Yamamoto, Kyoto (JP); Hiroyuki Ito, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 568 days.

(21) Appl. No.: 17/691,768

(22) Filed: Mar. 10, 2022

(65) Prior Publication Data

US 2022/0209356 A1 Jun. 30, 2022

Related U.S. Application Data

(63) Continuation of application No. PCT/JP2020/037608, filed on Oct. 2, 2020.

(30) Foreign Application Priority Data

Oct. 8, 2019 (JP) ................................ 2019-184927

(51) Int. Cl.
*H01M 50/284* (2021.01)
*H01M 50/107* (2021.01)
*H01M 50/566* (2021.01)

(52) U.S. Cl.
CPC ....... *H01M 50/284* (2021.01); *H01M 50/107* (2021.01); *H01M 50/566* (2021.01); *H01M 2220/30* (2013.01)

(58) Field of Classification Search
CPC ............. H01M 50/284; H01M 50/107; H01M 50/566; H01M 2220/30; H01M 50/213;
(Continued)

(56) References Cited

U.S. PATENT DOCUMENTS

| 8,415,038 B2 | 4/2013 | Kim et al. | |
|---|---|---|---|
| 2004/0115519 A1* | 6/2004 | Lee | H01M 10/425 |
| | | | 429/61 |

(Continued)

FOREIGN PATENT DOCUMENTS

| JP | 9171804 A | 6/1997 |
|---|---|---|
| JP | 2019121587 A | 7/2019 |
| WO | 2010044590 A2 | 4/2010 |

OTHER PUBLICATIONS

Machine Trasnlation CN104916794A Description (Year: 2024).*

(Continued)

*Primary Examiner* — Matthew T Martin
*Assistant Examiner* — Felicity B Alban
(74) *Attorney, Agent, or Firm* — K&L Gates LLP

(57) ABSTRACT

A battery pack includes a circuit board, a battery cell, an exterior case having a cylindrical shape, and a pair of external terminals respectively provided at both ends of the exterior case, in which each of the external terminals includes an inserted portion to be inserted into the exterior case and an uninserted portion not to be inserted into the exterior case, at least a part of the circuit board is disposed between the battery cell and the external terminals, and an elastic resin is provided so as to be in contact with the battery cell, the at least part of the circuit board, and the external terminals.

7 Claims, 18 Drawing Sheets

(58) Field of Classification Search
CPC .. H01M 50/543; H01M 10/052; H01M 50/20; H01M 50/152; Y02E 60/10
See application file for complete search history.

(56) References Cited

U.S. PATENT DOCUMENTS

| | | |
|---|---|---|
| 2010/0136374 A1 | 6/2010 | Jang et al. |
| 2010/0273047 A1* | 10/2010 | Kunoike ............ H01M 50/193 429/181 |
| 2011/0281144 A1 | 11/2011 | Yoon et al. |
| 2017/0338521 A1* | 11/2017 | Zhang ................ H01M 50/159 |
| 2019/0207273 A1 | 7/2019 | Chen et al. |

OTHER PUBLICATIONS

Chinese Office Action issued Aug. 24, 2023 in corresponding Chinese Application No. 202080070491.0.
International Search Report of corresponding PCT application PCT/JP2020/037608, dated Dec. 28, 2020.
Japanese Office Action issued Mar. 28, 2023 in corresponding Japanese Application No. 2021-551499.

* cited by examiner

BATTERY PACK AND ELECTRONIC DEVICE

CROSS REFERENCE TO RELATED APPLICATIONS

The present application is a continuation of PCT patent application no. PCT/JP2020/037608 filed on Oct. 2, 2020, which claims priority to Japanese patent application no. JP2019-184927 filed on Oct. 8, 2019, the entire contents of which are being incorporated herein by reference.

BACKGROUND

The present application relates to a battery pack and an electronic device.

A cylindrical nonaqueous electrolyte secondary battery (such as a lithium ion secondary battery) is used as a power supply source for various devices such as electric tools and wearable devices, for example, a conventional battery pack in which caps with terminals are inserted at both ends of a cylindrical can, and the caps with terminals are covered with a label.

SUMMARY

The present disclosure relates to a battery pack and an electronic device.

However, in the conventional battery pack, since the caps with terminals are fixed only to the label, there is a high possibility that the caps with terminals move or come off due to user's handling, dropping of the battery pack, vibration, or the like. When the caps with terminals move or come off, the conduction between the caps with terminals and the structure inside the cylindrical can (such as a protection circuit board) is lost, which may interfere with the operation of the battery pack.

In view of the above, the present technology is directed to providing, in an embodiment, a battery pack that prevents an external terminal inserted into an exterior case from being easily detached, and an electronic device to which the battery pack is applied.

In an embodiment, the present technology provides a battery pack including:

a circuit board;

a battery cell;

an exterior case having a cylindrical shape; and a pair of external terminals respectively provided at both ends of the exterior case, in which each of the external terminals includes an inserted portion to be inserted into the exterior case and an uninserted portion not to be inserted into the exterior case, at least a part of the circuit board is disposed between the battery cell and the external terminal, and an elastic resin is provided so as to be in contact with the battery cell, the at least a part of the circuit board, and the external terminal.

The present technology may be an electronic device including the battery pack described above according to an embodiment.

According to an embodiment of the present technology, it is possible to prevent the external terminals inserted into the exterior case from being easily detached. Note that the contents of the present technology are not to be construed as being limited by the effects exemplified in the present specification.

DETAILED DESCRIPTION

Figure 1:
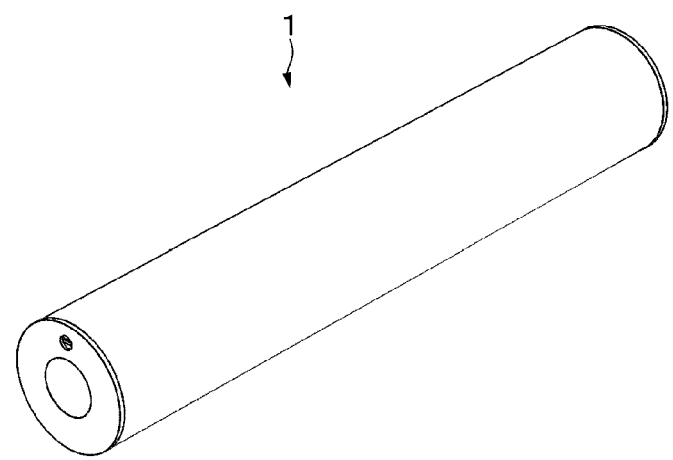
FIG. 1 is a perspective view of a battery pack according to an embodiment.

The present technology will be described below with reference to the drawings to one or more embodiments.

Described below are preferred specific examples of the present technology according to an embodiment and the content of the present technology is not limited thereby.

It is to be noted that the scope of the present technology is not intended to be limited only to the dimensions, materials, and shapes of constituent members described herein and the like, relative arrangements thereof, description of directions such as upper, lower, left, and right directions, and the like, which are merely examples for description, unless otherwise specified. Note that sizes, positional relationships, and the like of members illustrated in the drawings may be exaggerated for clarity of description. Also, only part of reference numerals may be illustrated, or the illustration may be simplified in order to prevent the illustration from being complicated. Furthermore, in the following description, the same names and reference numerals indicate the same members or members of the same quality, and redundant description will be appropriately omitted. Furthermore, each of elements constituting the present technology may be of an aspect in which a single member constitutes a plurality of elements and serves as a plurality of elements, or conversely, a function of one member may be shared and realized by a plurality of members.

Figure 2:
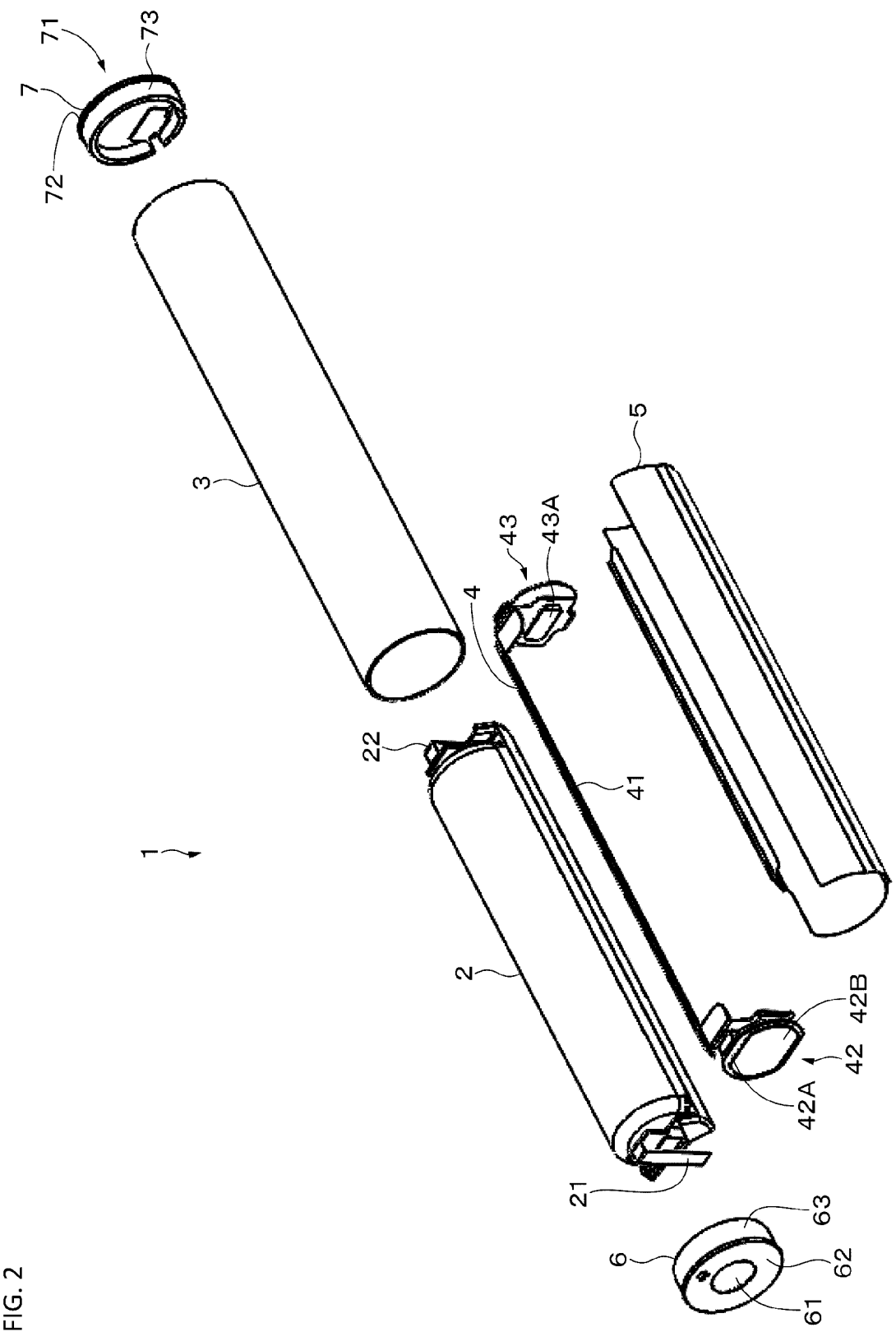
FIG. 2 is an exploded perspective view of the battery pack according to the embodiment.
Figure 3:
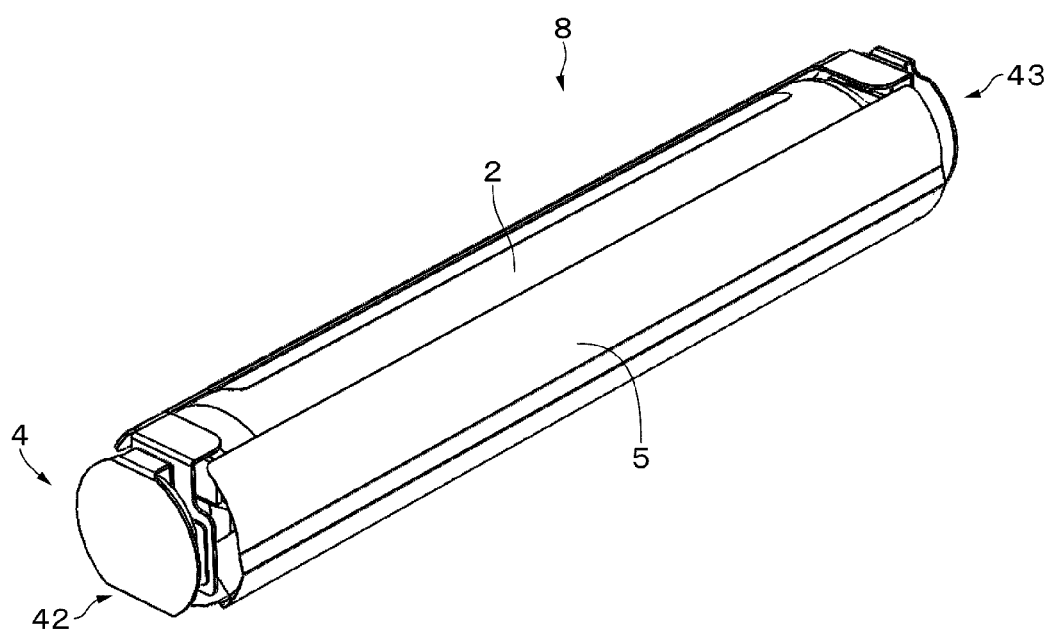
FIG. 3 is a perspective view of an assembly of the battery pack according to the embodiment.

First, an overall configuration example of a battery pack (battery pack 1) according to the present embodiment will be described with reference to FIGS. 1 to 3. FIG. 1 is a perspective view of the battery pack 1. FIG. 2 is an exploded perspective view of the battery pack 1. FIG. 3 is a perspective view of a structure of the battery pack 1 excluding an exterior tube (referred to as an assembly (assy) 8 as appropriate).

As shown in FIG. 1, the battery pack 1 has a substantially cylindrical shape. The battery pack 1 is, for example, a lithium ion secondary battery that can be used like a dry battery.

As shown in FIG. 2, the battery pack 1 includes a battery cell 2, a cylindrical exterior tube 3, a circuit board 4, an insulating tape 5, and a pair of external terminals (a cap-shaped positive-electrode-side external terminal 6 and a cap-shaped negative-electrode-side external terminal 7) provided at both ends of the exterior tube 3. The battery cell 2 has, for example, a cylindrical shape, is a laminate type battery cell (in which a laminate film is externally mounted), and includes a positive electrode terminal 21 and a negative electrode terminal 22. The details of the battery cell 2 will be described later.

The exterior tube 3 houses the structure corresponding to the assembly 8 of the battery pack 1 therein. The positive-electrode-side external terminal 6 and the negative-electrode-side external terminal 7 are press-fitted into both ends of the exterior tube 3. The exterior tube 3 is formed of, for example, a single metal of each of stainless steel, nickel, and aluminum or an alloy material thereof. The exterior tube 3 is not limited to a metal exterior case but may be an exterior case molded using a single resin of each of polycarbonate (PC), polybutylene terephthalate (PBT), polyethylene terephthalate (PET), and acrylonitrile-butadiene-styrene copolymer resin (ABS) or materials such as alloy resins and blend resins of two of these resins.

The circuit board 4 includes a flexible printed circuit (FPC). Since the circuit board 4 is constituted of the FPC, the thickness of the circuit board 4 can be reduced. The circuit board 4 includes a coupling circuit board 41, a positive-electrode-side circuit board 42, and a negative-electrode-side circuit board 43. The coupling circuit board 41 couples the positive-electrode-side circuit board 42 and the negative-electrode-side circuit board 43 together. As described above, the coupling circuit board 41, the positive-electrode-side circuit board 42, and the negative-electrode-side circuit board 43 are integrally formed, whereby the manufacturing process can be simplified. In the present embodiment, the coupling circuit board 41 corresponds to a first circuit board, and the positive-electrode-side circuit board 42 and the negative-electrode-side circuit board 43 correspond to second circuit boards.

The coupling circuit board 41 has a thin plate shape and extends in the same direction as the longitudinal direction of the battery pack 1. Although details will be described later, the battery cell 2 includes a heat fusion portion on the side peripheral surface, and a wiring portion is disposed in a region of the side peripheral surface not overlapping the heat fusion portion. In the present embodiment, the wiring portion is the first circuit board constituted of a circuit board but may be a wiring board or a lead wire instead of the circuit board.

The positive-electrode-side circuit board 42 (part of the circuit board 4) has a thin plate shape extending in a direction substantially orthogonal to the extending direction of the coupling circuit board 41. The positive-electrode-side circuit board 42 is bent so as to form an appropriate number of layers (also referred to as zigzag). With such a configuration, an extra length of the positive-electrode-side circuit board 42 can be secured, and it is possible to suppress cutting of the positive-electrode-side circuit board 42 due to application of an impact. A reinforcing plate 42B is provided on an outermost surface 42A of the positive-electrode-side circuit board 42. As the reinforcing plate 42B, a resin or a film can be applied. The positive-electrode-side circuit board 42 is disposed between the battery cell 2 and the positive-electrode-side external terminal 6 inside the exterior tube 3.

The negative-electrode-side circuit board 43 (part of the circuit board 4) has a thin plate shape extending in a direction substantially orthogonal to the extending direction of the coupling circuit board 41. The negative-electrode-side circuit board 43 is bent so as to form an appropriate number of layers. With such a configuration, an extra length of the negative-electrode-side circuit board 43 can be secured, and it is possible to suppress cutting of the negative-electrode-side circuit board 43 due to application of an impact. For example, a protection circuit 43A is provided between layers of the negative-electrode-side circuit board 43 or on the innermost surface of the negative-electrode-side circuit board 43. The protection circuit 43A is a circuit that performs a known protection operation for preventing overcurrent, overdischarge, and the like of the battery pack 1. The negative-electrode-side circuit board 43 is disposed between the battery cell 2 and the negative-electrode-side external terminal 7 inside the exterior tube 3.

The positive-electrode-side circuit board 42 of the circuit board 4 is welded to the positive electrode terminal 21 of the battery cell 2. The negative-electrode-side circuit board 43 of the circuit board 4 is welded to the negative electrode terminal 22 of the battery cell 2. As a result, the battery cell 2 and the protection circuit 43A are electrically connected. Then, the insulating tape 5 is wound around the battery cell 2 and the circuit board 4 (specifically, the coupling circuit board 41) integrated by welding, thereby forming the assembly 8 (see FIG. 3). By winding the insulating tape 5 around the battery cell 2 and the circuit board 4, it is possible to prevent the exterior tube 3 from having polarity, thereby preventing a short circuit from occurring between the exterior tube 3 and the positive-electrode-side external terminal 6 or the negative-electrode-side external terminal 7, so that the safety of the battery pack 1 can be improved. Further, by winding the insulating tape 5 around the battery cell 2 and the circuit board 4, it is possible to prevent the circuit board 4 from being disconnected.

The positive-electrode-side external terminal 6 includes a circular positive-electrode-side conductive portion 61 made of metal and a circular positive-electrode-side insulating portion 62 provided so as to surround the positive-electrode-side conductive portion 61. The positive-electrode-side insulating portion 62 is formed of, for example, resin. The positive-electrode-side insulating portion 62 includes a positive-electrode-side flange portion 63 made of resin and erected from the vicinity of the peripheral edge portion on the inner surface (main surface on the side toward the inside of the exterior tube 3) of the positive-electrode-side insulating portion 62. By inserting the positive-electrode-side flange portion 63 into the exterior tube 3, the positive-electrode-side external terminal 6 is press-fitted into the exterior tube 3. The positive-electrode-side conductive portion 61 is welded to the positive-electrode-side circuit board 42 of the circuit board 4.

The negative-electrode-side external terminal 7 includes a circular negative-electrode-side conductive portion 71 made of metal and a circular negative-electrode-side insulating portion 72 provided so as to surround the negative-electrode-side conductive portion 71. The negative-electrode-side insulating portion 72 is formed of, for example, resin. The negative-electrode-side insulating portion 72 includes a negative-electrode-side flange portion 73 made of resin and erected from the vicinity of the peripheral edge portion on the inner surface (main surface on the side toward the inside of the exterior tube 3) of the negative-electrode-side insulating portion 72. By inserting the negative-electrode-side flange portion 73 into the exterior tube 3, the negative-electrode-side external terminal 7 is press-fitted into the exterior tube 3. Accordingly, the positive-electrode-side external terminal 6 and the negative-electrode-side external terminal 7, that is, the external terminals, are provided at both ends of the exterior tube 3. The negative-electrode-side conductive portion 71 is connected to the negative-electrode-side circuit board 43 of the circuit board 4. Details of the positive-electrode-side external terminal 6 and the negative-electrode-side external terminal 7 will be described later.

Figure 4:
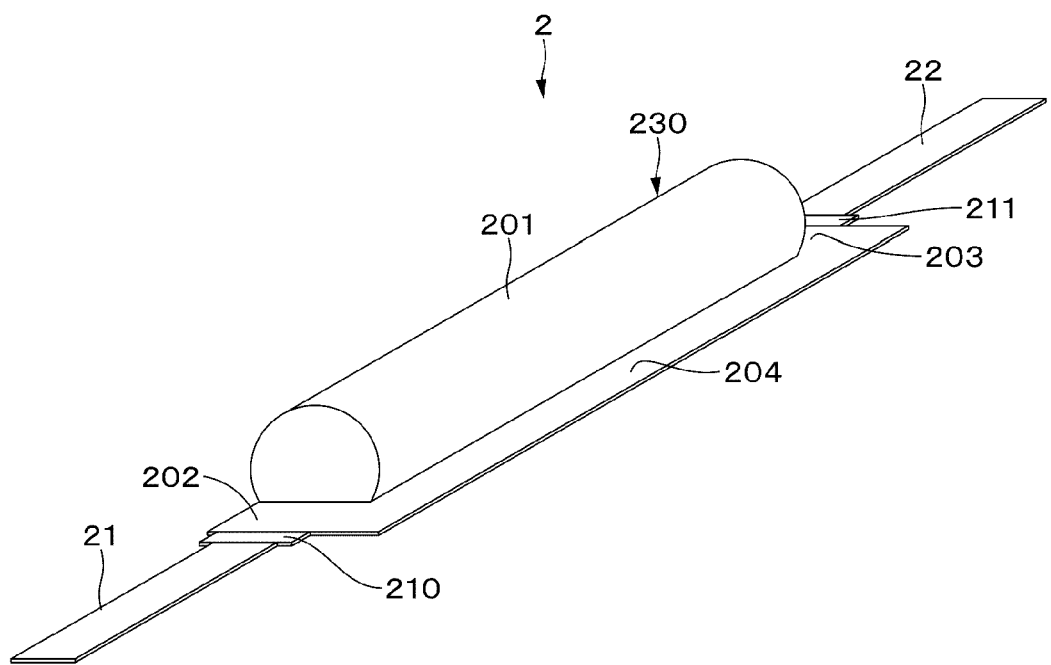
FIG. 4 is a diagram to be referred to when a configuration example of a battery cell according to the embodiment is described.
Figure 5:
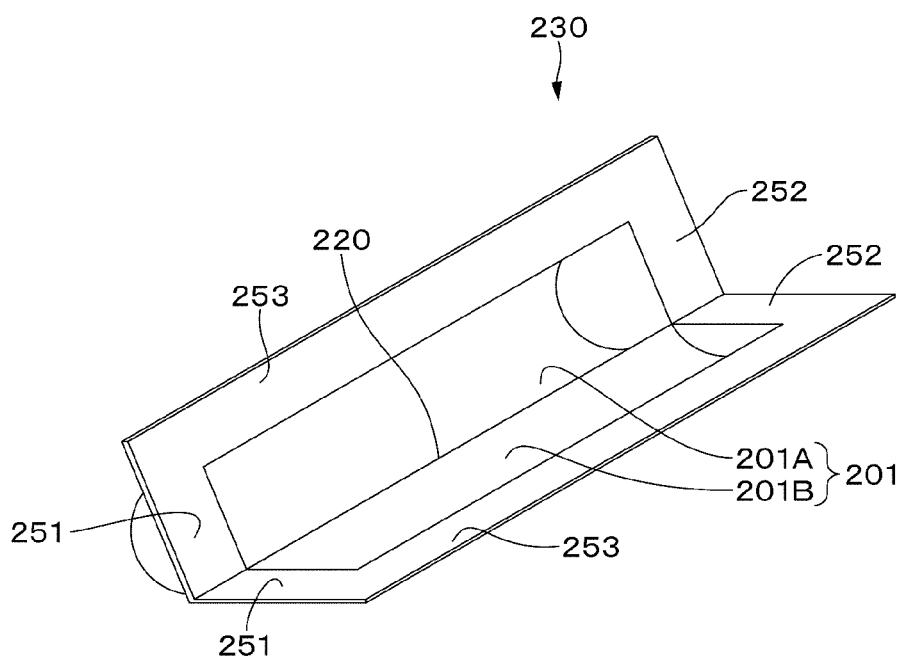
FIG. 5 is a diagram to be referred to when the configuration example of the battery cell according to the embodiment is described.
Figure 6:
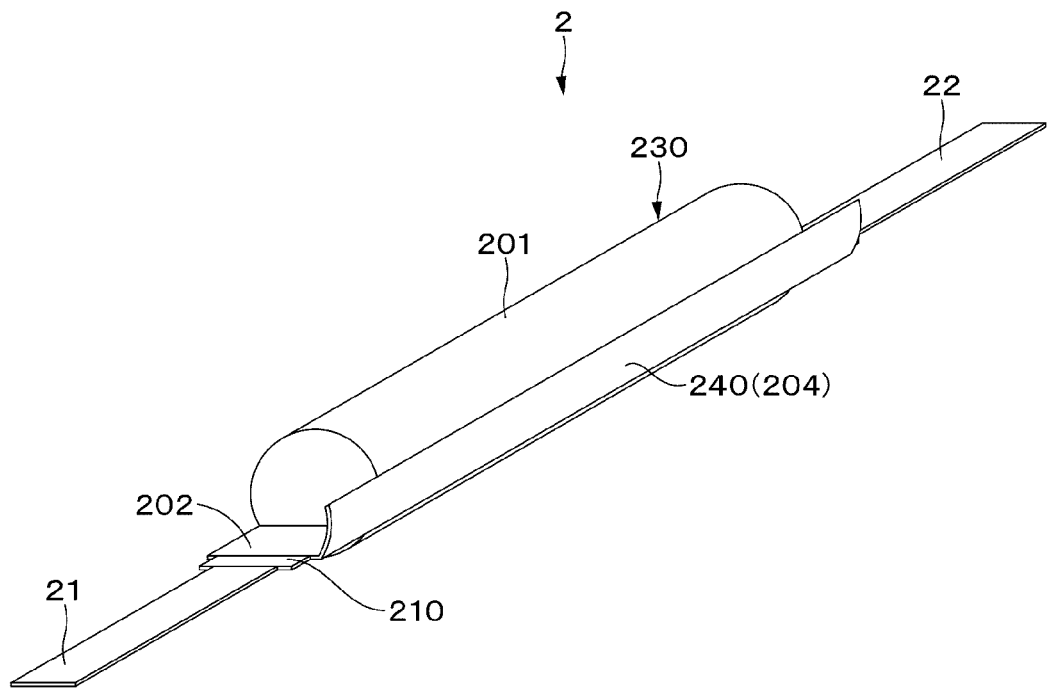
FIG. 6 is a diagram to be referred to when the configuration example of the battery cell according to the embodiment is described.

Next, the battery cell 2 according to the present embodiment will be described with reference to FIGS. 4 to 6. The battery cell 2 includes a film-like exterior material 230 (specifically, a laminate film) including a substantially cylindrical housing portion 201 that houses a substantially cylindrical wound electrode assembly (not shown) and sealing portions 202, 203, and 204 provided on three sides of a periphery of the housing portion 201 excluding a folded portion 220 on a peripheral surface side, and a positive electrode lead and a negative electrode lead connected to the electrode assembly. The positive electrode lead corresponds to the above-described positive electrode terminal 21, and the negative electrode lead corresponds to the above-described negative electrode terminal 22.

The exterior material 230 has plasticity. The exterior material 230 is what is called a laminate film and includes a metal layer, a surface protective layer provided on one surface of the metal layer, and a heat fusion layer provided on the other surface of the metal layer. If necessary, the exterior material 230 may further include an adhesive layer between the surface protective layer and the metal layer and/or between the heat fusion layer and the metal layer. Of both surfaces of the exterior material 230, the surface on the surface protective layer side serves as an outer surface ("outer side surface of the exterior material 230"), and the surface on the heat fusion layer side serves as an inner surface that houses the electrode assembly ("inner side surface of the exterior material 230").

The metal layer plays a role of preventing entry of moisture and the like and protecting the electrode assembly, which is an object to be housed. As a material of the metal layer, for example, a metal foil made of aluminum, an aluminum alloy, or the like is used. As the material of the surface protective layer, for example, nylon or polyethylene terephthalate is used from the viewpoint of toughness, flexibility, and the like. As a material of the heat fusion layer, for example, a polyolefin resin such as polyethylene, poly-propylene, modified polyethylene, and modified polypropylene is used from the viewpoint of flexibility and suppression of entry of moisture and the like. As a material of the adhesive layer, for example, an acrylic adhesive, a polyester adhesive, a polyurethane adhesive, or the like is used. From the viewpoint of beauty of appearance and the like, the exterior material 230 may further include a colored layer or may include a coloring material in at least one layer of the surface protective layer, the heat fusion layer, and the adhesive layer. As a specific example of the exterior material 230, the exterior material disclosed in WO 2017/119486 can be applied.

The sealing portions 202 and 203 are provided on both end surface sides of the housing portion 201, and the sealing portion 204 is provided on the peripheral surface side of the housing portion 201. As shown in FIG. 5, the exterior material 230 includes two substantially partial cylindrical housing portions 201A and 201B extending in the same direction, arranged in a direction orthogonal to the extending direction, and having different depths, and peripheral edge portions 251, 252, and 253 provided on three sides, which are both end surface sides and the peripheral surface side (side surface side), of each of the housing portions 201A and 201B. The exterior material 230 is folded back at the folded portion 220 between the adjacent housing portions 201A and 201B such that the peripheral edge portions 251, 252, and 253 of the housing portions 201A and 201B overlap each other, and the housing portions 201A and 201B are combined. The overlapping peripheral edge portions 251, 252, and 253 are sealed by heat fusion or the like to form sealing portions 202, 203, and 204, respectively. The combined substantially partial cylindrical housing portions 201A and 201B form the substantially cylindrical housing portion 201.

One end of the positive electrode terminal 21 is electrically connected to the positive electrode of the electrode assembly, and the other end of the positive electrode terminal 21 is led out to the outside of the exterior material 230 through the sealing portion 202. One end of the negative electrode terminal 22 is electrically connected to the negative electrode of the electrode assembly, and the other end of the negative electrode terminal 22 is led out to the outside of the exterior material 230 through the sealing portion 203. It is preferable that a sealant material 210 such as a heat fusion material be provided between the positive electrode terminal 21 and the exterior material 230. It is preferable that a sealant material 211 such as a heat fusion material be provided also between the negative electrode terminal 22 and the exterior material 230. Accordingly, it is possible to improve the adhesion between the positive electrode terminal 21 and the negative electrode terminal 22 led out from the exterior material 230 and the inner side surface of the exterior material 230.

The exterior material 230 is formed with, for example, a deep drawing device. In the present embodiment, after sealing by heat fusion or the like, the sealing portion 204 that has been appropriately cut is bent along the peripheral surface of the housing portion 201 as shown in FIG. 6. Then, the bent sealing portion 204 is bonded and fixed to the peripheral surface of the housing portion 201 by heat fusion or the like. By bending the sealing portion 204 in this manner, the peripheral surface of the battery cell 2 comes to have a shape closer to a columnar shape, and the entire battery pack 1 can be downsized. Note that a bent and heat-fused portion of the sealing portion 204 corresponds to a heat fusion portion (hereinafter appropriately referred to as a heat fusion portion 240). Note that the thickness of the above-described coupling circuit board 41 is set to be equal to or less than the thickness of the heat fusion portion 240.

The positive electrode terminal 21 and the negative electrode terminal 22 are preferably bent in a U shape along the end surfaces of the electrode assembly (see FIG. 2). This is because the volume efficiency of the housing portion 201 can be increased. Each of the positive electrode terminal 21 and the negative electrode terminal 22 is made of, for example, a metal material such as aluminum, copper, nickel, and stainless steel and has a shape such as a thin plate shape or a reticulate shape. Each of the sealant materials 210 and 211 is made of a material having adhesiveness to the positive electrode terminal 21 and the negative electrode terminal 22, and examples of the material include a polyolefin resin such as polyethylene, polypropylene, modified polyethylene, and modified polypropylene.

The electrode assembly housed in the housing portion 201 includes a positive electrode, a negative electrode, and a separator each having a long rectangular shape and has a wound structure in which the positive electrode and the negative electrode are wound in a longitudinal direction thereof with the separator interposed therebetween. The positive electrode includes, for example, a foil of metal such as aluminum as a positive electrode current collector and positive electrode active material layers containing a positive electrode active material on both surfaces thereof. The negative electrode includes, for example, a foil of metal such as copper as a negative electrode current collector and negative electrode active material layers containing a negative electrode active material on both surfaces thereof. Nickel, stainless steel, or the like can also be used as a material of the positive electrode current collector and the negative electrode current collector.

The positive electrode active material is a positive electrode material capable of occluding and releasing lithium, and for example, a lithium-containing compound such as a lithium oxide, a lithium phosphorus oxide, a lithium sulfide, or an interlayer compound containing lithium is suitable, two or more of which may be mixed and used. In order to increase the energy density, a lithium-containing compound containing lithium, a transition metal element, and oxygen is preferable. Examples of such a lithium-containing combination include a lithium composite transition metal oxide having a layered rock salt structure and a lithium composite phosphate having an olivine structure. The lithium-containing compound preferably contains at least one selected from the group consisting of cobalt, nickel, manganese, and iron as a transition metal element. Other examples of the positive electrode material capable of occluding and releasing lithium include inorganic compounds containing no lithium, such as $MnO_2$, $V_2O_5$, $V_5O_{13}$, NiS, and MoS.

The negative electrode active material is a negative electrode material capable of occluding and releasing lithium, and examples thereof include carbon materials such as non-graphitizable carbon, graphitizable carbon, graphite, pyrolytic carbons, cokes, glassy carbons, organic polymer compound fired bodies, carbon fibers, and activated carbon. As the graphite, natural graphite subjected to a spheroidizing treatment or the like, substantially spherical artificial graphite, or the like is preferably used. As the artificial graphite, artificial graphite obtained by graphitizing mesocarbon microbeads (MCMB), artificial graphite obtained by graphitizing or pulverizing a coke raw material, or the like is preferable. Examples of the cokes include pitch coke, needle coke, and petroleum coke. The organic polymer compound fired body refers to a carbonized product obtained by firing a polymer material such as a phenol resin or a furan resin at an appropriate temperature, and some are classified as non-graphitizable carbon or graphitizable carbon. Examples of the polymer material include polyacetylene and polypyrrole. These carbon materials are preferable because the change in the crystal structure caused during charge and discharge is very small, a high charge and discharge capacity can be obtained, and good cycle characteristics can be obtained.

The separator allows lithium ions to pass while preventing short circuit of current due to contact between the positive and negative electrodes and is, for example, a porous membrane made of a synthetic resin including polyethylene, polypropylene, polytetrafluoroethylene, a mixture or a copolymer thereof, or a porous membrane made of ceramic. The separator may be a laminate of two or more kinds of these porous membranes. Among them, a porous membrane made of polyolefin is preferable because it has an excellent short circuit preventing effect and can improve the safety of the battery due to a shutdown effect at a high temperature, and a porous membrane made of polyethylene is particularly preferable.

The electrode assembly contains a nonaqueous electrolytic solution. An electrolyte layer containing a nonaqueous electrolytic solution and a polymer compound holding the nonaqueous electrolytic solution may be provided between the positive and negative electrodes together with the separator. In this case, the electrolyte layer may be used instead of the separator, and the separator may not be provided. The nonaqueous electrolytic solution contains a solvent and an electrolyte salt. In order to improve battery characteristics, the nonaqueous electrolytic solution may further contain a known additive.

Next, a configuration example of the positive-electrode-side external terminal 6 according to the present embodiment will be described with reference to FIGS. 7 and 8. In the present embodiment, the negative-electrode-side external terminal 7 has the same configuration as the positive-electrode-side external terminal 6 unless otherwise specified. Of course, there may be a slight difference such as a difference in polarity marks.

Figure 7:
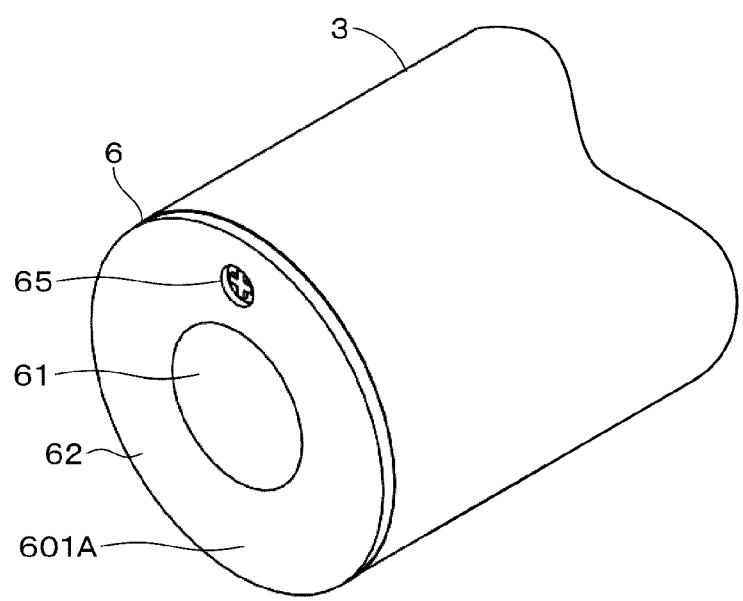
FIG. 7 is a diagram to be referred to when a configuration example of a positive-electrode-side external terminal according to the embodiment is described.
Figure 8:
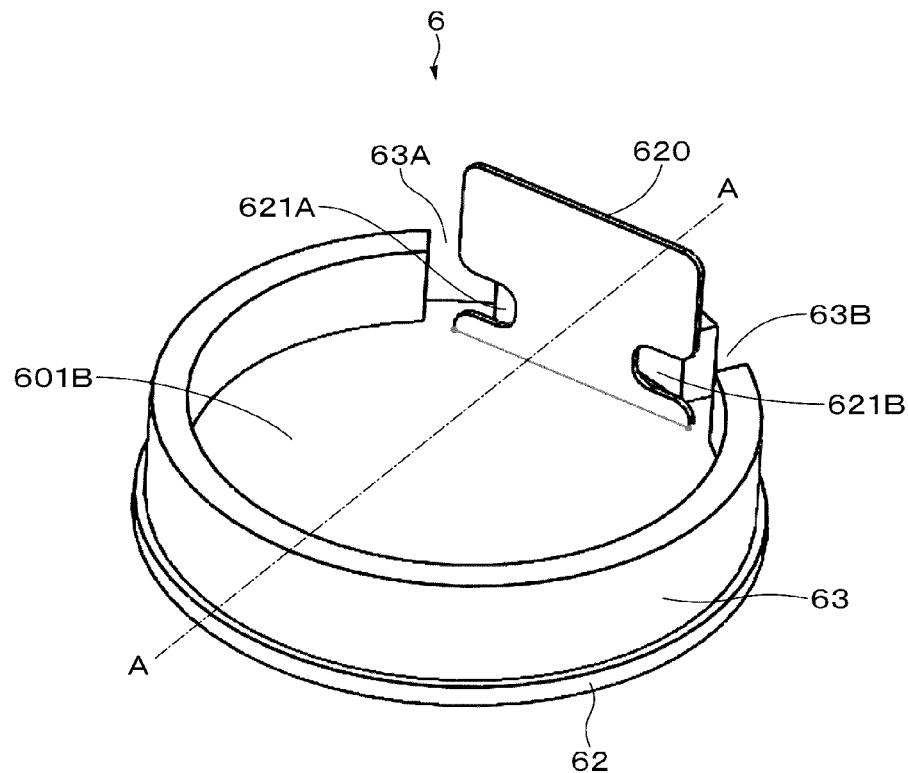
FIGS. 8A and 8B are diagrams to be referred to when a configuration example of the positive-electrode-side external terminal according to the embodiment is described.

FIG. 7 shows the positive-electrode-side external terminal 6 in a state of being press-fitted into one open end of the exterior tube 3. As described above, the positive-electrode-side insulating portion 62 is provided around the positive-electrode-side conductive portion 61. A mark 65 indicating polarity (plus) is formed at a predetermined position of an outer surface (main surface on the side exposed to the outside) 601A of the positive-electrode-side insulating portion 62.

Figure 8B:
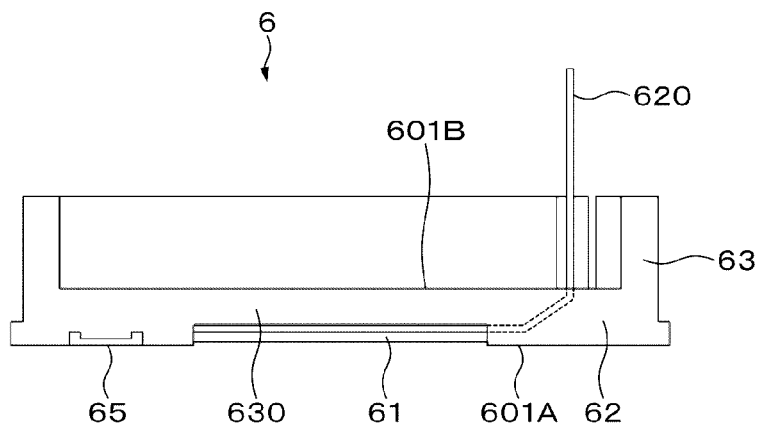

FIG. 8A is a perspective view of the positive-electrode-side external terminal 6 as viewed from the inside, and FIG. 8B shows a section when the positive-electrode-side external terminal 6 is cut along the cutting line A-A in FIG. 8A. As shown in FIG. 8A, the positive-electrode-side flange portion 63 is erected from the vicinity of the peripheral edge portion of an inner surface 601B of the positive-electrode-side insulating portion 62. The positive-electrode-side flange portion 63 schematically has a ring shape, but in the present embodiment, cutout portions 63A and 63B, which are portions where the positive-electrode-side flange portion 63 is absent, are formed. The cutout portions 63A and 63B extend in a direction parallel to the longitudinal direction of the exterior tube 3 in a state where the positive-electrode-side external terminal 6 is press-fitted into the exterior tube 3. Since the cutout portions 63A and 63B are formed, the positive-electrode-side flange portion 63 is easily deformed, and the positive-electrode-side external terminal 6 can be easily press-fitted into the exterior tube 3. Furthermore, since the welding area between a positive electrode tab 620 and the positive-electrode-side circuit board 42 can be increased by the cutout portions 63A and 63B, stronger bonding can be performed.

A part of the positive electrode tab 620 having a thin plate shape is erected from the vicinity of the edge of the inner surface 601B of the positive-electrode-side external terminal 6. As shown in FIG. 8B, a part of the positive electrode tab 620 is disposed in the positive-electrode-side insulating portion 62 and is connected to the positive-electrode-side conductive portion 61. For example, after the positive-electrode-side conductive portion 61 and the positive electrode tab 620 are welded, the positive-electrode-side insulating portion 62 is formed by molding or the like. The positive electrode tab 620 and the positive-electrode-side conductive portion 61 may be an integral conductor.

U-shaped cutout portions 621A and 621B are formed at appropriate positions of the exposed portion of the positive electrode tab 620, such as at respective opposing side portions (see FIG. 8A). Since the cutout portions 621A and 621B are formed, the positive electrode tab 620 can be easily bent in an appropriate direction. The positive electrode tab 620 bent in an appropriate direction and the positive-electrode-side circuit board 42 of the circuit board 4 are connected by welding.

As shown in FIG. 8B, a part of the positive-electrode-side insulating portion 62 is interposed on a part of the inside of the positive-electrode-side conductive portion 61 (including the portion of the positive electrode tab 620 welded to the positive-electrode-side conductive portion 61), specifically, between the positive-electrode-side conductive portion 61 (including the portion of the positive electrode tab 620 welded to the positive-electrode-side conductive portion 61) and the inner surface 601B of the positive-electrode-side insulating portion 62. A part of the positive-electrode-side insulating portion 62 functions as a reinforcing portion 630.

When the battery pack 1 is dropped or the like, it is necessary to prevent the positive-electrode-side conductive portion 61 from being damaged and to protect the positive-electrode-side conductive portion 61. Therefore, in the present embodiment, as shown in FIG. 8B, the positive-electrode-side external terminal 6 is formed such that the outer end surface of the positive-electrode-side conductive portion 61 is provided to be recessed inward from the outer end surface of the positive-electrode-side insulating portion 62, that is, the outer surface 601A of the positive-electrode-side insulating portion 62.

As in the present embodiment, since the positive-electrode-side external terminal 6 has a configuration in which the positive-electrode-side conductive portion 61 and the cap-shaped positive-electrode-side insulating portion 62 are integrated, a clearance between parts can be eliminated.

Next, a configuration example of connection portions of the battery cell 2, the circuit board 4, and the positive-electrode-side external terminal 6 will be described with reference to FIG. 9. The configuration example of a connection portion on the positive-electrode-side external terminal 6 side will be described below, but the configuration of a connection portion on the negative-electrode-side external terminal 7 side is also similar to the configuration of the connection portion on the positive-electrode-side external terminal 6 side.

Figure 9A:
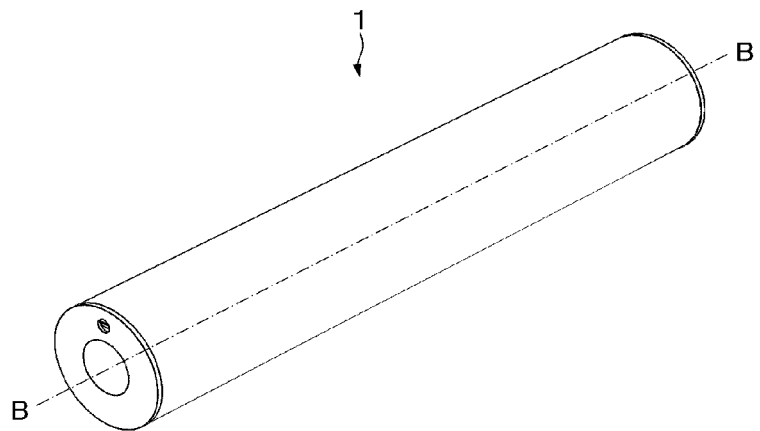
FIGS. 9A and 9B are diagrams to be referred to when a connection configuration example of the battery cell, a circuit board, and the positive-electrode-side external terminal according to the embodiment is described.
Figure 9B:
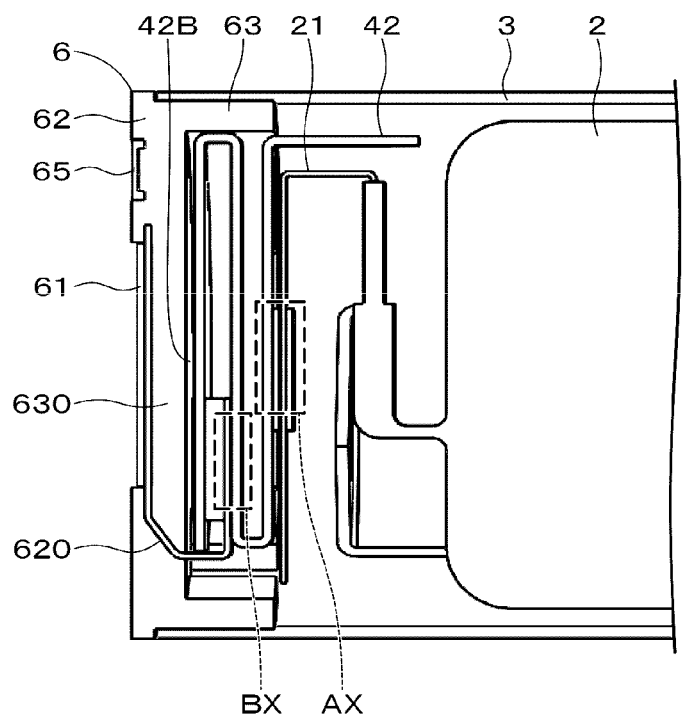

FIG. 9A is a perspective view of the overall battery pack 1, and FIG. 9B is an enlarged view of a section on a positive electrode side when the battery pack 1 is cut along the cutting line B-B in FIG. 9A. In FIG. 9B, illustration of the insulating tape 5 and the coupling circuit board 41 is omitted as appropriate.

As shown in FIG. 9B, a surface located on the innermost side among a plurality of surfaces (surfaces substantially orthogonal to the longitudinal direction of the battery tube 3) of the positive-electrode-side circuit board 42 and the positive electrode terminal 21 are welded to each other at a portion denoted by a reference symbol AX. Further, a predetermined surface (such as the third surface as viewed from the outside of the battery tube 3) of the positive-electrode-side circuit board 42 and the vicinity of the tip of the positive electrode tab 620 bent in a U shape in a sectional view are welded to each other at a portion denoted by a reference symbol BX. As a result, the battery cell 2, the circuit board 4, and the positive-electrode-side external terminal 6 are electrically connected.

In the present embodiment, the positive-electrode-side circuit board 42 includes the reinforcing plate 42B, and the positive-electrode-side external terminal 6 includes the reinforcing portion 630. Since the circuit board 4 is formed of a flexible printed circuit board, the thickness of the board can be reduced. On the other hand, since the flexible printed circuit board has lower strength than a printed circuit board (PCB), when an impact is applied to the positive-electrode-side conductive portion 61, there is a possibility that the positive-electrode-side conductive portion 61 is pushed into the exterior tube 3 or a welded portion between the positive electrode tab 620 and the positive-electrode-side circuit board 42 is disconnected. However, in the present embodiment, since the reinforcing portion 630 serves as a receptacle for the positive-electrode-side conductive portion 61, the positive-electrode-side conductive portion 61 can be prevented from being pushed into the exterior tube 3 when an impact is applied due to falling of the battery pack 1 or the like. Further, by providing the reinforcing plate 42B, deformation of the positive-electrode-side circuit board 42 can be suppressed, so that disconnection between the positive-electrode-side circuit board 42 and the positive electrode tab 620 can be prevented.

Figure 10:
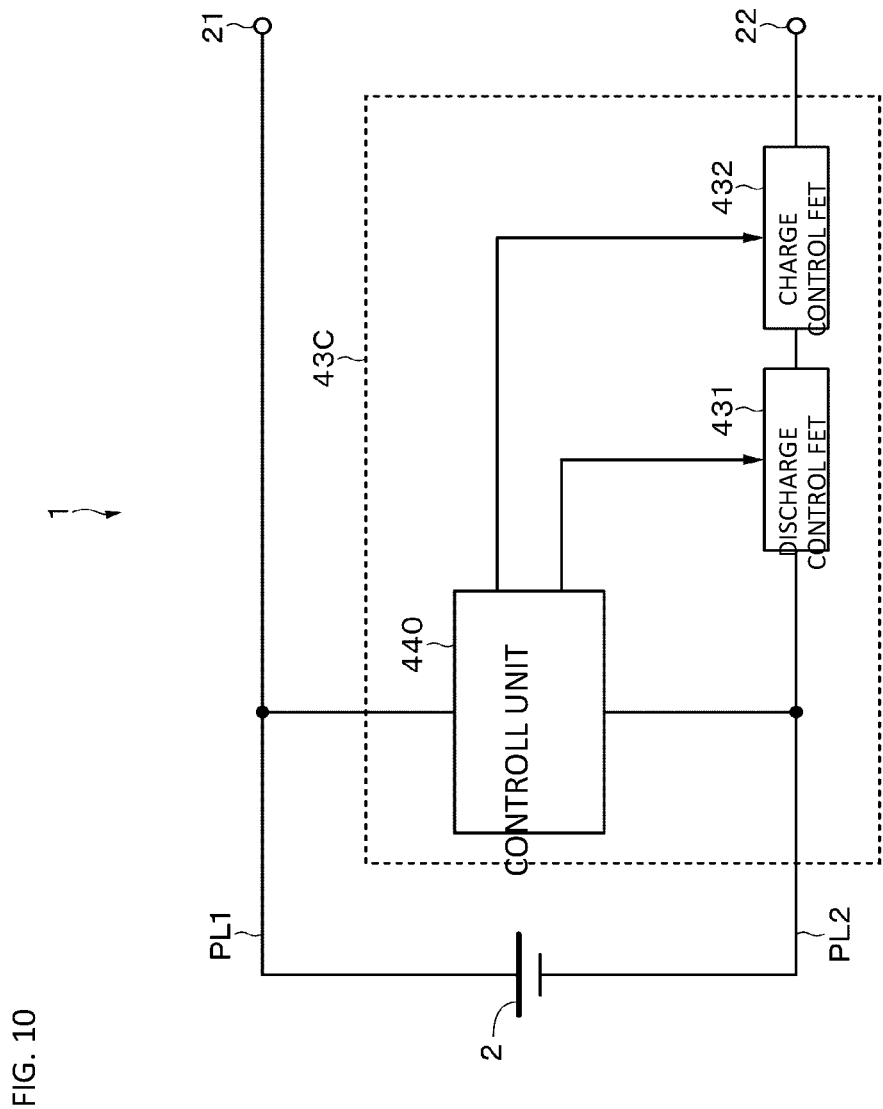
FIG. 10 is a diagram illustrating a circuit configuration example of the battery pack according to the embodiment.

Next, a circuit configuration example of the battery pack 1 will be described with reference to FIG. 10 according to an embodiment. As shown in FIG. 10, the positive electrode terminal 21 is led out from the positive electrode side of the battery cell 2 via a power line PL1. The negative electrode terminal 22 is led out from the negative electrode side of the battery cell 2 via a power line PL2.

The above-described protection circuit 43C is, for example, a one-chip integrated circuit (IC) including a discharge control field effect transistor (FET) 431, a charge control FET 432, and a control unit 440. The discharge control field effect transistor (FET) 431 and the charge control FET 432 are connected to the power line PL2 but may be connected to the power line PL1. The control unit 440 is connected between the power lines PL1 and PL2.

Operations of the discharge control FET 431 and charge control FET 432 are controlled by the control unit 440. For example, the discharge control FET 431 is turned off when the battery voltage becomes an overdischarge detection voltage or when an overcurrent is detected, and is controlled to prevent a discharge current flowing through the current path of the battery cell 2. In addition, the charge control FET 432 is turned off when the voltage of the battery cell 2 becomes an overcharge detection voltage, and is controlled to prevent a charge current flowing through the current path of the battery cell 2.

Next, an example of a method for manufacturing the battery pack 1 will be described according to an embodiment. First, the positive electrode terminal 21 and the positive-electrode-side circuit board 42 are welded. Further, the negative electrode terminal 22 and the negative-electrode-side circuit board 43 are welded. Then, the assembly 8 is formed by winding the insulating tape 5. Then, after the positive-electrode-side circuit board 42 and the positive electrode tab 620 are welded, the positive-electrode-side external terminal 6 is press-fitted into the positive electrode side of the exterior tube 3 while the negative electrode side of the assembly 8 is inserted into the exterior tube 3 from the positive electrode side of the exterior tube 3. As the positive-electrode-side external terminal 6 is press-fitted, the positive-electrode-side circuit board 42 is bent so as to be folded. The positive-electrode-side circuit board 42 may be bent in advance. After the negative-electrode-side circuit board 43 and the negative electrode tab of the negative-electrode-side external terminal 7 are welded, the negative-electrode-side external terminal 7 is press-fitted into the negative electrode side of the exterior tube 3, thereby forming the battery pack 1. Of course, the battery pack 1 may be manufactured by another manufacturing method.

Figure 11A:
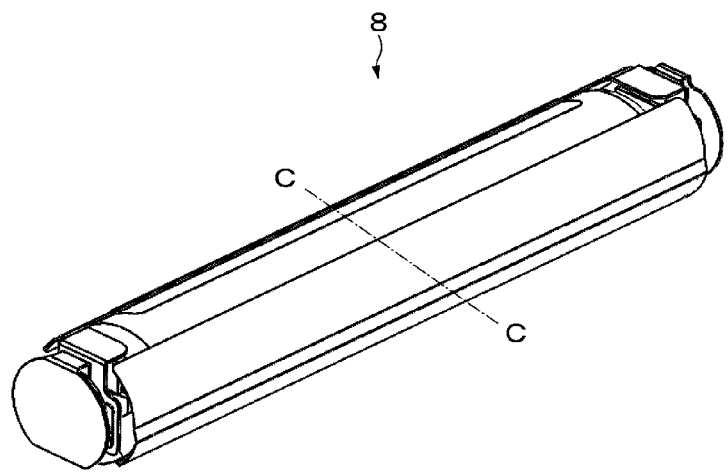
FIGS. 11A and 11B are diagrams to be referred to when a first feature of the battery pack according to the embodiment is described.
Figure 11B:
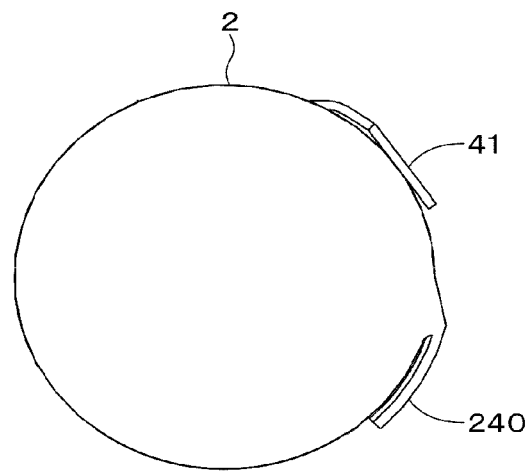

Next, a first feature of the battery pack 1 according to the present embodiment will be described with reference to FIGS. 11 and 12. FIG. 11A shows the assembly 8 of the battery pack 1, and FIG. 11B shows a section of the assembly 8 when the assembly 8 is cut along the cutting line C-C in FIG. 11A. In FIG. 11B, illustration of the insulating tape 5 is omitted as appropriate.

As described above, the battery cell 2 includes the heat fusion portion 240 on the side peripheral surface. The coupling circuit board 41 is disposed in a region of the side peripheral surface not overlapping with the heat fusion portion 240. For example, if the coupling circuit board 41 is disposed on the side opposite to the heat fusion portion 240, the thickness of the coupling circuit board 41 is included in the diameter of the assembly 8, and the volume energy density decreases. However, as shown in FIG. 11B, by disposing the coupling circuit board 41 along the heat fusion portion 240, the thickness of the coupling circuit board 41 can be prevented from being included in the diameter of the assembly 8. Therefore, the battery pack 1 can be downsized, and a decrease in volume energy density can be suppressed.

Figure 12:
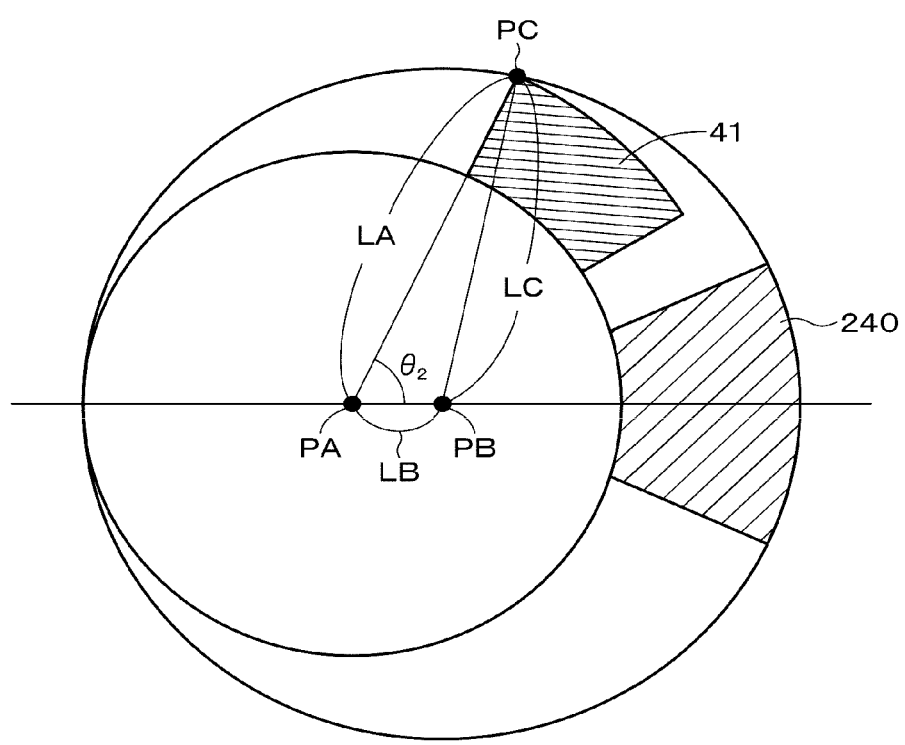
FIG. 12 is a diagram to be referred to when the first feature of the battery pack according to the embodiment is described.

FIG. 12 is a diagram specifically showing a certain region in which the coupling circuit board 41 is disposed. For example, the region in which the coupling circuit board 41 is disposed is set as follows. Note that the thickness (maximum value) of the heat fusion portion 240 is denoted by s,
the thickness of the coupling circuit board 41 is denoted by f,
the radius of the battery cell 2 excluding the heat fusion portion 240 is denoted by c, and
the radius of the battery cell 2 including the heat fusion portion 240 is denoted by (2c+s)/2. These values are known values by specifications or measurements.

An angle $\theta_2$ that does not affect (does not increase the outer dimension) the outer diameter dimension of the battery cell 2 including the heat fusion portion 240 also when the coupling circuit board 41 having a thickness f is disposed is obtained from the formula described below, and the coupling circuit board 41 is disposed in a region based on an angle $\theta_1$ (absolute value) smaller than the angle $\theta_2$.

The angle $\theta_2$ is set as follows.

(Step P1)
The center point of the outer diameter of the battery cell 2 (excluding the heat fusion portion 240) is set to PA, the center point of the outer diameter of the battery cell 2 including the heat fusion portion 240 is set to PB, and a position on the coupling circuit board 41 that is located on the end surface of the coupling circuit board 41 on the side away from the heat fusion portion 240 and not in contact with the peripheral surface of the battery cell 2 is set to PC (see FIG. 12).

(Step P2)
When the side between PA-PC is referred to as a side LA, the side between PB-PA is referred to as a side LB, and the side between PB-PC is referred to as a side LC, the length of each side is defined as follows.

$$LA = f + c$$
$$LB = (2c + s)/2 - c = s/2$$
$$LC = (2c + s)/2$$

Assuming that an angle formed by the side LA and the side LB is the angle $\theta_2$, the angle $\theta_2$ can be expressed by Formula 1 below.

$$\cos\theta_2 = (cs - 2cf - f_2)/s(c + f) \quad \text{(Formula 1)}$$

(Step P3)
The angle $\theta_2$ is obtained by substituting known values of c, f, and s into Formula 1. When the coupling circuit board 41 is actually disposed, the coupling circuit board 41 can be disposed without increasing the diameter of the battery cell 2 by disposing the coupling circuit board 41 so as to satisfy $\theta_2 \geq \alpha_1$, where $\theta_1$ is an angle formed by the end of the coupling circuit board 41 in the direction opposite to the heat fusion portion 240 side, the center of the outer diameter of the battery cell 2, and the center of the outer diameter of the battery cell 2 including the heat fusion portion 240. That is, it is possible to appropriately and effectively utilize the space in terms of diameter increased by the heat fusion portion 240.

Figure 13:
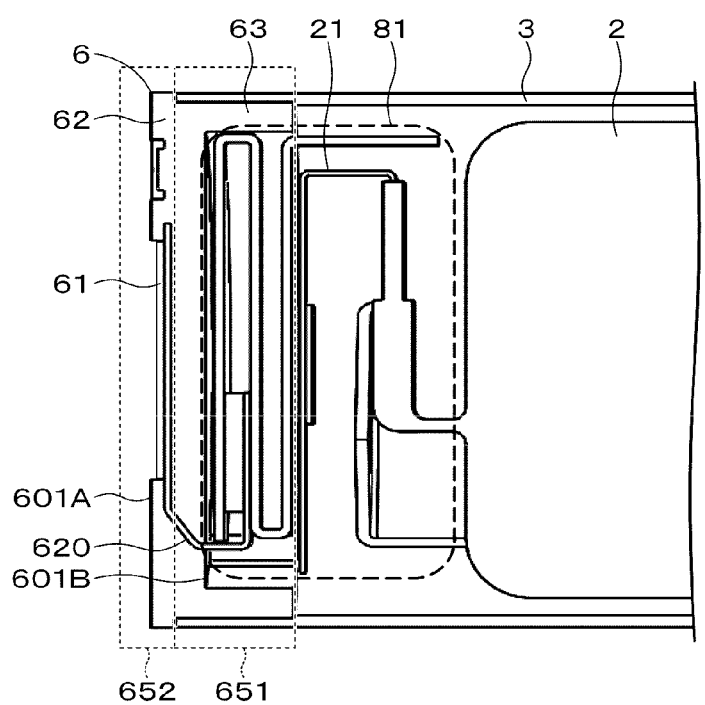
FIG. 13 is a diagram to be referred to when a second feature of the battery pack according to the embodiment is described.

Next, a second feature of the battery pack 1 according to the present embodiment will be described with reference to FIG. 13. FIG. 13 shows an internal structure near an end (near the positive electrode) of the battery pack 1. In a state in which the positive-electrode-side external terminal 6 is press-fitted into the exterior tube 3, the positive-electrode-side external terminal 6 includes an inserted portion 651 that is inserted into the exterior tube 3 and an uninserted portion 652 that is not inserted into the exterior tube 3. The inserted portion 651 includes, for example, the positive-electrode-side flange portion 63 and a part (vicinity of the inner surface 601B) of the positive-electrode-side insulating portion 62. The uninserted portion 652 includes, for example, the positive-electrode-side conductive portion 61 and a part (vicinity of the outer surface 601A) of the positive-electrode-side insulating portion 62.

In the present embodiment, an elastic resin 81 is provided near the end inside the exterior tube 3. Specifically, the elastic resin 81 is provided so as to be in contact with the battery cell 2, the positive-electrode-side external terminal 6, and the circuit board 4. More specifically, the elastic resin 81 is provided so as to be in contact with the positive electrode terminal 21 of the battery cell 2, the inserted portion 651 of the positive-electrode-side external terminal 6, and the positive-electrode-side circuit board 42 of the circuit board 4. For example, after the elastic resin 81 before curing is filled and the positive-electrode-side external terminal 6 is press-fitted, the elastic resin 81 is cured.

As the elastic resin 81, for example, a bond containing a silyl-terminated polymer having a hardness after curing of 30 to 70 Shore A as a main component can be used. More preferably, a bond having a hardness of 50 Shore A is used as the elastic resin 81. A hardness of 50 Shore A indicates the hardness on the order of a plastic eraser. By using the elastic resin 81, impact at the time of dropping can be absorbed by the elastic resin 81. In addition, a bond having a viscosity of 5 to 200 Pa·s can be applied. Accordingly, it is possible to prevent the filled bond from unnecessarily entering the inside of exterior tube 3. Further, it is possible to prevent the positive-electrode-side external terminal 6 from coming off (being removed) from the exterior tube 3 due to curing of the filled elastic resin 81. Since the cutout portions 63A and 63B are formed in the positive-electrode-side external terminal 6, the elastic resin 81 is provided on the inner surface of the exterior tube 3 through the cutout portions 63A and 63B, so that the positive-electrode-side external terminal 6 can be firmly fixed to the exterior tube 3.

Figure 14:
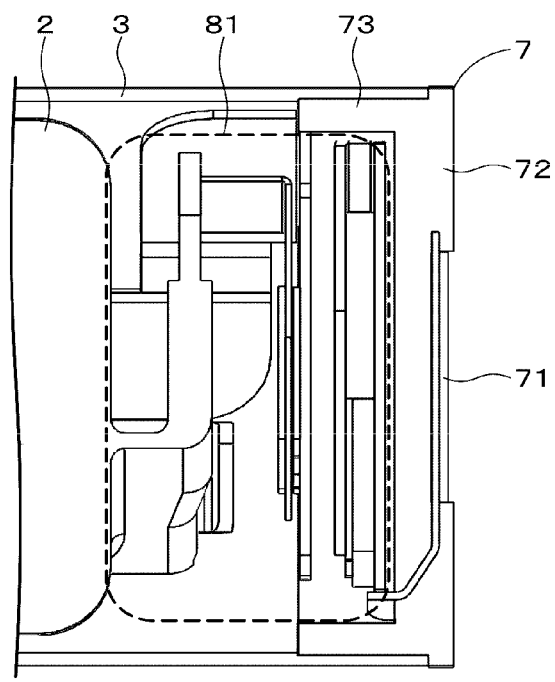
FIG. 14 is a diagram to be referred to when the second feature of the battery pack according to the embodiment is described.

As shown in FIG. 14, the elastic resin 81 may be provided in the same manner at the portion where the negative-electrode-side external terminal 7 is inserted into the exterior tube 3. Preferably, the elastic resin 81 is provided on both the positive electrode side and the negative electrode side.

Although the embodiment of the present technology has been specifically described above, the content of the present technology is not limited to the above-described embodiment, and various modifications based on the technical idea of the present technology are possible.

Figure 15A:
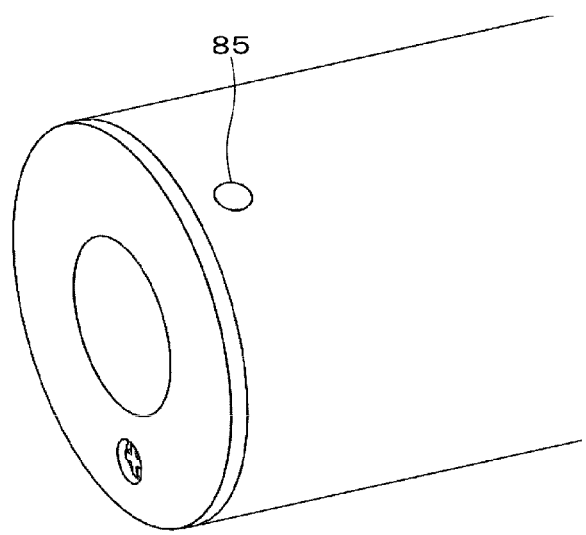
FIGS. 15A and 15B are diagrams illustrating a modification.
Figure 15B:
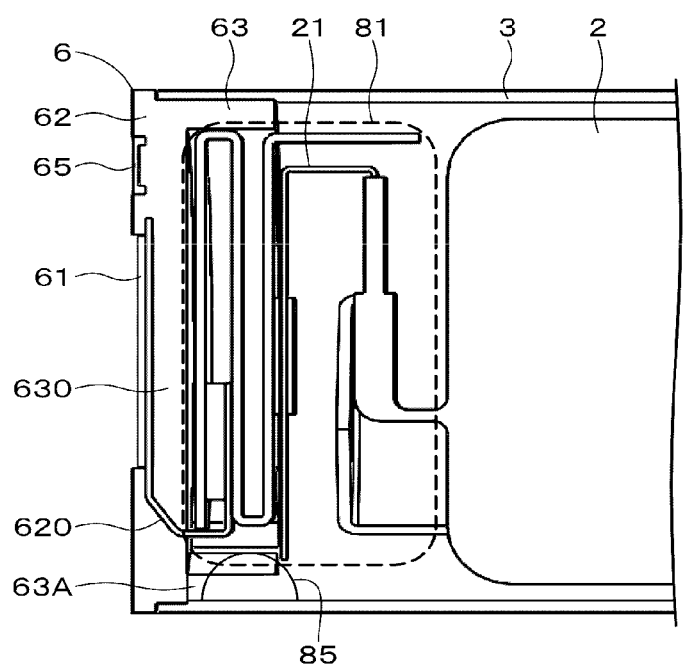

As shown in FIG. 15A, for example, a recessed portion 85 (also referred to as a punch or the like) recessed toward the inside of the exterior tube 3 may be formed in the vicinity of the end of the exterior tube 3. The recessed portion 85 is formed, for example, at a position corresponding to the cutout portion 63A of the positive-electrode-side external terminal 6. With such a configuration, as shown in FIG. 15B, a projecting portion formed by the recessed portion 85 toward the inside of the exterior tube 3 reaches the elastic resin 81 through the cutout portion 63A. By forming the recessed portion 85 before the elastic resin 81 is cured, the elastic resin 81 can be bonded to the recessed portion 85 after the elastic resin 81 is cured. Therefore, the positive-electrode-side external terminal 6 can be reliably prevented from coming off from the exterior tube 3. Of course, a recessed portion may be formed in the vicinity of the end on the negative electrode side.

Figure 16A:
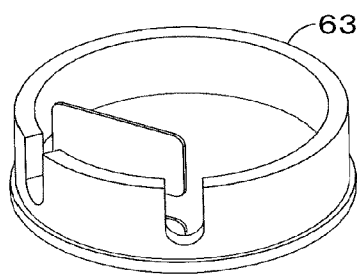
FIGS. 16A to 16F are diagrams illustrating modifications.
Figure 16B:
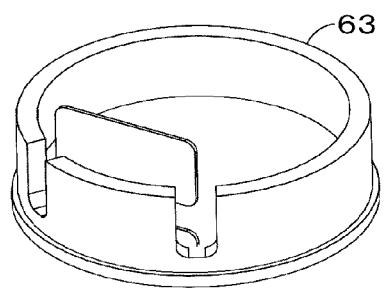
Figure 16C:
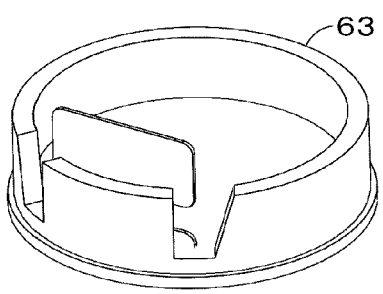
Figure 16D:
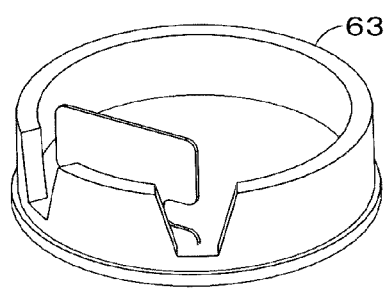
Figure 16E:
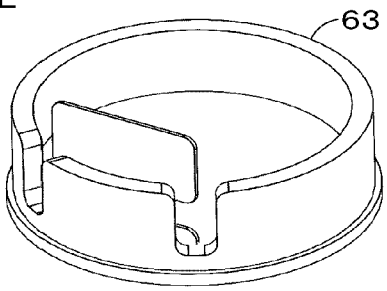
Figure 16F:
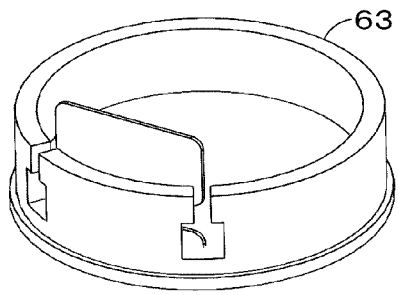

As shown in FIGS. 16A to 16F, for example, the shapes of the cutout portions 63A and 63B can be changed as appropriate. For example, as shown in FIG. 16A, the shape of the cutout portions may have a U-shape. As shown in FIG. 16B, the cutout portions may be relatively deep cutout portions. In addition, as illustrated in FIGS. 16C and 16D, the cutout portions may have tapered shapes in which the width decreases toward the tip (inner surface 601B side). In addition, as shown in FIG. 16E, corners near the open ends of the cutout portions may be cut. In addition, as shown in FIG. 16F, the shape of the cutout portions may be a shape in which the width on the tip side is larger than the width on the open end side. With such a shape as shown in FIG. 16F, the above-mentioned recessed portion 85 can be brought into strong contact with the cutout portions, and the positive-electrode-side external terminal 6 and the exterior tube 3 can be therefore more firmly fixed to each other. In addition, the number of the cutout portions is not limited to two but may be an appropriate number.

In the above-described embodiment, the heat fusion portion 240 may not be heat-fused to the peripheral surface of the exterior tube 3 but may be merely bent, or the heat fusion portion 240 may be made of resin. In addition, the shape of the exterior tube 3 may not be a cylindrical shape but may be a substantially cylindrical shape or a columnar shape without departing from the present technology. The present technology can also be applied to a battery other than the lithium ion secondary battery. In addition, depending on the shape of the circuit board 4, the entire circuit board can have the same arrangement position and shape as a part of the circuit board in the above-described embodiment.

The battery pack 1 may have both the first and second features described above. In addition, the features of the battery pack 1 are not limited to the first and second features described above, and any configuration and function of the matters disclosed in the present specification can be a feature.

An application example in which the present technology is applied to a wristband-type electronic device will be described below according to an embodiment. The wristband-type electronic device is also called a smart band and can acquire data related to human activities such as the number of steps, a moving distance, consumed calories, an amount of sleep, and a heart rate, data related to an external environment such as temperature and humidity, and the like only by being wound around an arm. Furthermore, the acquired data can be managed with a smartphone or the like. Further, it is also possible to have a mail transmission/reception function, and for example, it is possible to notify the user of an incoming mail by a light emitting diode (LED) lamp and/or vibration.

Figure 17:
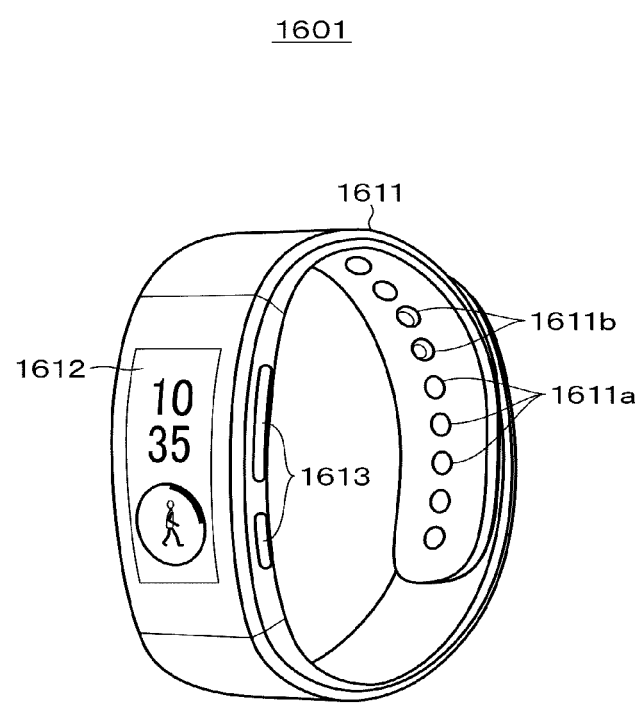
FIG. 17 is a diagram illustrating an application example of the battery pack according to the embodiment.

FIG. 17 shows an appearance example of a wristband-type electronic device 1601. The electronic device 1601 is a watch-type wearable device that is detachable from a human body. The electronic device 1601 includes a band portion 1611 worn on an arm, a display device 1612 that displays numbers, characters, patterns, and the like, and operation buttons 1613.

In the use state, the electronic device 1601 is curved such that the band portion 1611 has a substantially circular shape as shown in FIG. 17, and protrusions 1611b are inserted into holes 1611a to achieve attachment to the arm. A sensor (not illustrated) is provided inside the band portion 1611 at a part or the whole thereof, and various types of data described above can be acquired. Note that the sensor may be mounted on a circuit board on the display device 1612 side.

Figure 18:
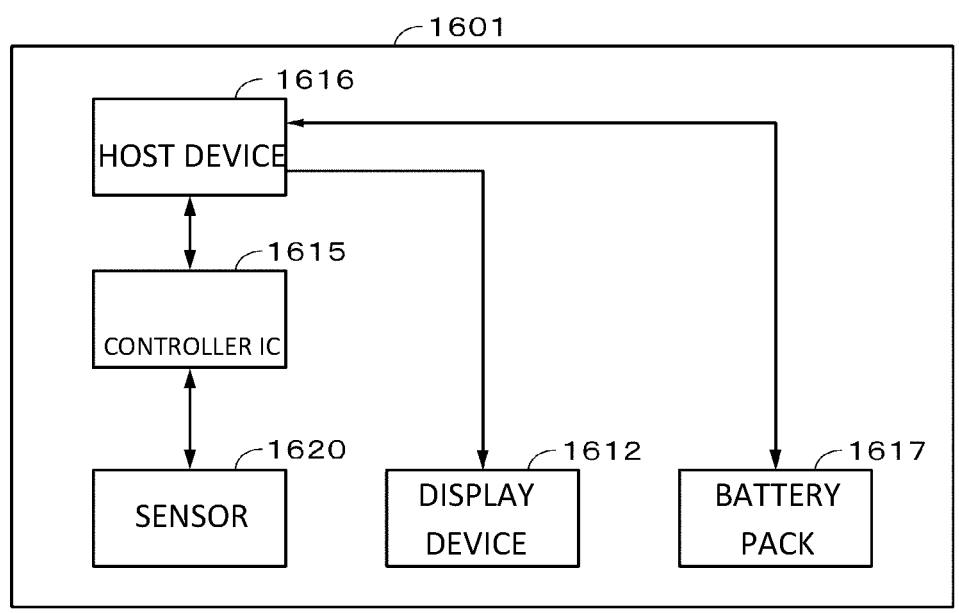
FIG. 18 is a diagram illustrating the application example of the battery pack according to the embodiment.

FIG. 18 shows a circuit configuration example of the electronic device 1601. In addition to the display device 1612 described above, the electronic device 1601 includes a controller IC 1615 as a drive control unit, a sensor 1620, a host device 1616, and a battery pack 1617 as a power supply. The sensor 1620 may include the controller IC 1615.

The sensor 1620 can detect both pressing and bending. The sensor 1620 detects a change in electrostatic capacitance according to the pressing and outputs an output signal corresponding to the change to the controller IC 1615. In addition, the sensor 1620 detects a change in resistance value (resistance change) according to bending and outputs an output signal corresponding to the change to the controller IC 1615. The controller IC 1615 detects pressing and bending of the sensor 1620 based on the output signal from the sensor 1620 and outputs information corresponding to the detection result to the host device 1616.

The host device 1616 executes various processes on the basis of the information supplied from the controller IC 1615. For example, a process such as display of character information, image information, and the like on the display device 1612, movement of a cursor displayed on the display device 1612, scrolling of a screen, and the like is executed.

The display device 1612 is, for example, a flexible display device and performs display on the screen on the basis of a video signal, a control signal, or the like supplied from the host device 1616. Examples of the display device 1612 include a liquid crystal display, an electro luminescence (EL) display, and an electronic paper but are not limited thereto.

The battery pack 1 according to the above-described embodiment or the modifications thereof can be applied to the battery pack 1617.

The present technology is applicable to various electronic devices including a battery and is not limited to the wristband-type electronic device 1601 described in the above-described application example. Examples of the electronic devices other than the above-described application example include combustion smoking implements (electronic cigarettes), portable devices such as smartphones, eyeglass-type terminals (head mounted displays and the like), toys, and the like.

DESCRIPTION OF REFERENCE SYMBOLS

1: Battery pack
2: Battery cell
3: Exterior tube
4: Circuit board
5: Insulating tape
6: Positive-electrode-side external terminal
7: Negative-electrode-side external terminal
21: Positive electrode terminal
22: Negative electrode terminal
41: Coupling circuit board
42: Positive-electrode-side circuit board
43: Negative-electrode-side circuit board
43A: Protection circuit
61: Positive-electrode-side conductive portion
62: Positive-electrode-side insulating portion
63A, 63B: Cutout portion
71: Negative-electrode-side conductive portion
72: Negative-electrode-side insulating portion
240: Heat fusion portion
630: Reinforcing portion It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
a circuit board;
a battery cell;
an exterior case having a cylindrical shape; and
a pair of external terminals respectively provided at both ends of the exterior case,
wherein
each of the external terminals includes an inserted portion to be inserted into the exterior case and an uninserted portion not to be inserted into the exterior case,
at least a part of the circuit board is disposed between the battery cell and the external terminals,
an elastic resin is provided so as to be in contact with the battery cell, the at least part of the circuit board, and the external terminals,
each of the external terminals includes a conductive portion and an insulating portion disposed around the conductive portion,
an outer end surface of the conductive portion is provided to be recessed inward with respect to an outer end surface of the insulating portion,
the inserted portion includes a cutout portion extending in a direction parallel to a longitudinal direction of the exterior case,
a recessed portion is formed at a position corresponding to the cutout portion in the exterior case, and
the cutout portion has a shape in which a width on a tip side is larger than a width on an open end side.

2. The battery pack according to claim 1, wherein the at least part of the circuit board is folded between the battery cell and the external terminals.

3. The battery pack according to claim 2, wherein the at least part of the circuit board is folded in a zigzag manner.

4. The battery pack according to claim 1, wherein
the battery cell and a first part of the circuit board are welded, and
a second part of the circuit board and the external terminals are welded.

5. The battery pack according to claim 1, wherein the elastic resin after curing has a hardness of 30 to 70 Shore A.

6. An electronic device comprising the battery pack according claim 1.

7. The battery pack according to claim 1, wherein the inserted portion includes a cutout portion extending in a direction parallel to a longitudinal direction of the exterior case.

* * * * *